Aug. 27, 1968 R. A. WALKER 3,399,386

APPARATUS FOR DELAYING A CONTINUOUS ELECTRICAL SIGNAL

Filed March 8, 1966 2 Sheets-Sheet 1

Inventor
Ray A. Walker
Roland A. Anderson
Attorney

Aug. 27, 1968 R. A. WALKER 3,399,386

APPARATUS FOR DELAYING A CONTINUOUS ELECTRICAL SIGNAL

Filed March 8, 1966 2 Sheets-Sheet 2

Inventor
Ray A. Walker
[signature]
Attorney 3,399,386
APPARATUS FOR DELAYING A CONTINUOUS ELECTRICAL SIGNAL Ray A. Walker, Pasco, Wash., assignor to the United States of America as represented by the United States Atomic Energy Commission Filed Mar. 8, 1966, Ser. No. 534,973
6 Claims. (Cl. 340—172.5)

ABSTRACT OF THE DISCLOSURE

An apparatus for delaying an input analog signal includes a variable oscillator for generating timing pulses, an analog to digital converter receiving the input analog signal, a magnetic core memory, a counter receiving the timing pulses for cyclically selecting successive storage locations in the core memory, circuitry for writing the analog to digital output in selected core memory storage locations after the previously stored information therein has been read, and a digital to analog converter receiving the information read from selected core memory storage locations and converting the information to analog form representative of the original input analog signal but delayed therefrom by the time required to cycle through all storage locations of the core memory.

The invention described herein was made in the course of, or under, a contract with the United States Atomic Energy Commission.

This invention relates to apparatus for producing a time delay of an electrical analog signal, and more particularly, to apparatus for adjusting the time delay of an analog signal to a predetermined value.

The main object of this invention is to provide apparatus for producing a predetermined time delay of a continuous electrical signal.

Another object of the invention is to provide apparatus for producing a predetermined time delay of a continuous electrical signal wherein the delayed signal is distortionless and not attenuated with respect to the original signal.

Briefly, the above objects of the invention are accomplished as indicated below. The continuous electrical signal, for which delay is desired, is periodically quantized into a corresponding digital representation which is stored in a conventional magnetic core memory system. The memory system is equipped with an address register which is pulsed by control circuitry to select storage locations in numerical sequence and is further adapted to cycle through the same set of storage locations without change in order after one addressing cycle is completed. When a given storage location is selected by the address register, memory read circuitry recovers the binary word contained in the newly-selected storage location, and then write circuitry writes the quantized representation of the input signal into that storage location. The binary word recovered from the memory is converted back to its original analog representation and presented to an output terminal. The memory address register is then advanced to the next storage location by a control signal and the same sequence of read and write operations mentioned above is carried out. The total delay time of the analog signal is approximately the time required for the memory address register to circulate through all of the memory locations once. The time base for the system is established by an oscillator having a repetition rate functionally related to the amplitude of its input signal. Consequently, the address register is advanced in timed relation to the repetition rate of the oscillator, and the total delay time of the analog signal is determined by the amplitude of the input voltage to the oscillator.

The invention may be better understood from the following detailed description of a preferred embodiment and the accompanying drawings in which.

Figure 1:
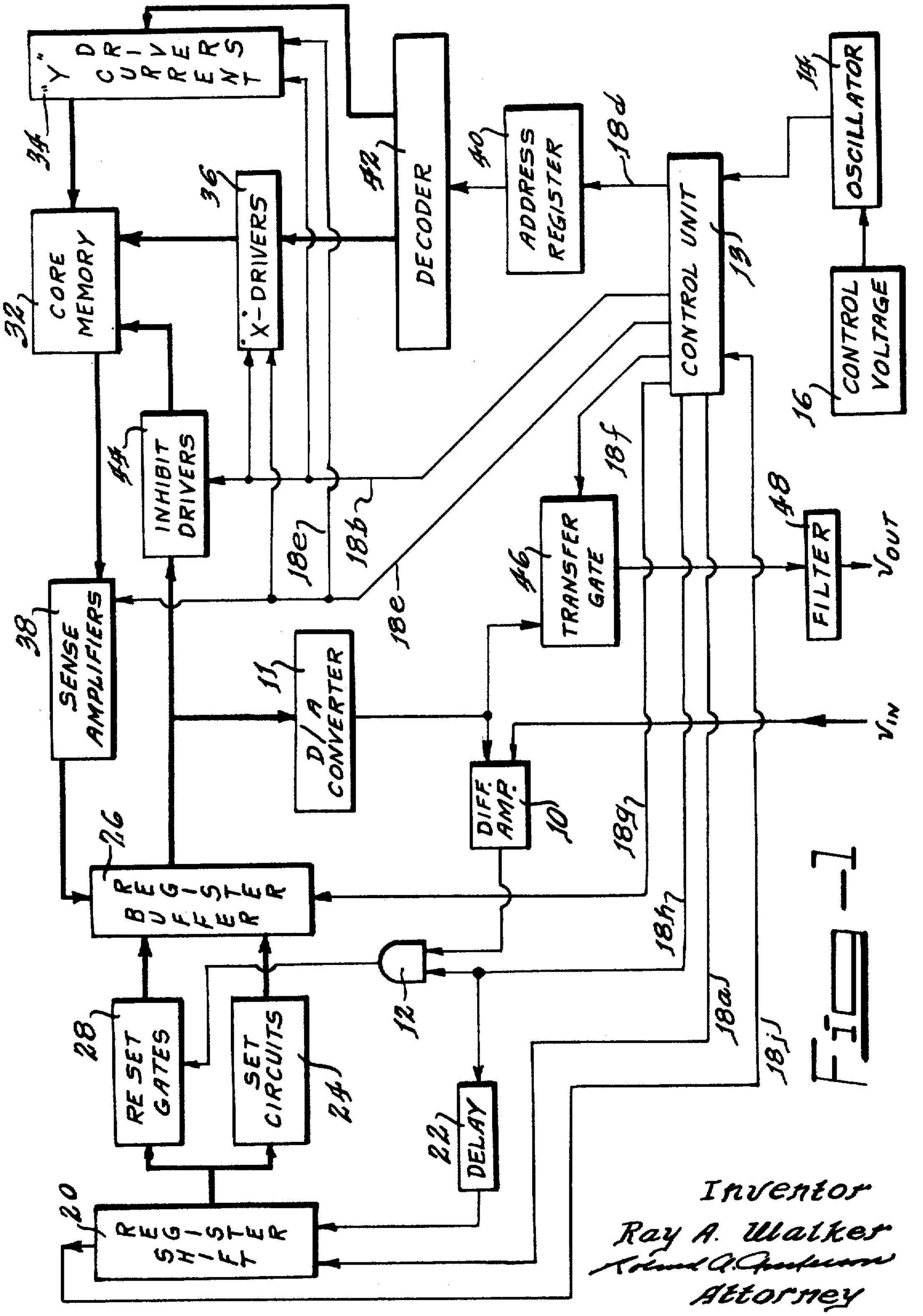
FIG. 1 is a functional block diagram of apparatus according to the present invention.

Referring to FIG. 1, a differential amplifier 10 has one input receiving the input voltage, $V_{in}$. The other input of differential amplifier 10 is the output of a digital to analog converter 11. The output of differential amplifier 10 is one input of an AND gate 12.

A control unit 13 receives the output signal of a voltage-controlled oscillator 14. The voltage-controlled oscillator 14 is a free-running oscillator of conventional design having its repetition rate dependent upon an input control voltage indicated by reference numeral 16. The repetition rate of oscillator 14 establishes the time base for the entire system. The control unit 13, which is shown in greater detail in FIG. 2 and described more completely below, receives clock pulses from the oscillator 14 and comprises decoding and gating circuitry of a kind well-known in the art to generate pulses controlling the timing of the various elements of the system. The control unit 13 supplies a clock pulse derived from oscillator 14 to enable AND gate 12 along line **18*h***.

One clock pulse from oscillator 14 is received by control unit 13 and transmitted along line **18*a* into a shift register 20. The shift register 20 comprises a number of bistable circuits connected so that serial information entered into the input of one bistable may be shifted to subsequent bistables in response to a clock or shift pulse. The shift register 20 is adapted to receive binary digits or bits in serial form along line 18*a*, and shift the bits responsive to a shift signal derived in control unit 13 and transmitted along a line 18*h* through a delay 22 to the shifting input of shift register 20**.

The output of the bistable circuits of shift register 20 may then be used in parallel since each bistable has an output independent of the others. In the instant case, a single bit, hereinafter referred to as the unit bit, is entered in shift register 20. The control unit 13 will not enter another bit in shift register 20 as long as the unit bit remains therein. The provisions for accomplishing this are contained in control unit 13 and explained in further detail below. The control unit 13 is adapted to supply clock pulses for shifting the unit pulse in shift register 20 and for enabling AND gate 12 through line **18*h* only during the time the unit bit is in shift register 20. The reason for delay 22** is outlined below.

Set gates 24 connect the outputs of the bistables of shift register 20 to corresponding set inputs of bistable circuits of a buffer register 26. The buffer register 26 comprises a set of bistable circuits, one associated with each of the bistables of the shift register 20. The bistables of buffer register 26 have a set input and a reset input terminal as well as set and reset output terminals. A logic "one" appearing at either the set or reset inputs will cause the set or reset output terminal, respectively, to exhibit a "one" output.

Reset gates 28 connect the set outputs of the bistables of shift register 20 to the reset inputs of the bistables of buffer register 26. The reset gates 28 are enabled (i.e. made operative, thereby allowing a signal in the form of a "one" at its input to be transferred to its output) by the output of differential amplifier 10 fed through AND gate 12. Each bistable of shift register 20 has associated with its set output one of the reset gates 28, one of the set gates 24, and one of the bistables of buffer register 26. In the preferred embodiment, eight bistables have been incorporated into both the shift register 20 and buffer register 26, for reasons explained below.

The digital to analog converter 11, also of conventional design, receives the outputs of the bistables of buffer register 26 in parallel, and generates from them a corresponding analog signal representation at its output.

The quantizing of the input continuous signal, $V_{in}$, is accomplished as follows. A single pulse or bit from the oscillator 14 is directed by control unit 13 along line 18*a* to set the first bistable of shift register 20; this is the unit bit mentioned above. The bistable of shift register 20 which contains the unit bit energizes its associated set circuit 24 to set its associated bistable comprising the most significant digit of buffer register 26. The digital to analog converter 11 converts the output of the buffer register 26 to its representative analog signal in real time. The output of the digital to analog converter 11 is compared with $V_{in}$ by differential amplifier 10. The differential amplifier 10 is constructed according to well-known techniques such that when its input from the digital to analog converter 11 is greater than its input $V_{in}$, a "one" signal will appear at the output of the differential amplifier 10, in which case a clock pulse from control unit 13 will enable AND gate 12 and transmit the output of differential amplifier 10 to enable the reset gates 28. This allows that bistable of shift register 20 which contains the unit bit to reset its associated bistable in buffer register 26. If $V_{in}$ had been larger than the output of the digital to analog converter 11, the output of AND gate 12 does not enable reset gates 28, and the bistable of buffer register 26 associated with that bistable of shift register 20 containing the unit bit remains in the set state.

Simultaneous with the clock pulses transmitted along line 18*h* to AND gate 12 are clock pulses sent through delay 22 to shift the unit pulse in shift register 20 to the succeeding bit location thereby energizing its associated set circuit 24 to set the bistable comprising the next less significant bit location of buffer register 26. The amount of time delay required for delay 22 is that which is sufficient for enabling AND gate 12 and one of the reset gates 28 to reset a bistable of buffer register 26.

As the unit bit progresses through the bit locations of shift register 20, each bistable of buffer register 26 will then either remain in the set or reset condition depending upon whether the output of the digital to analog converter 11 is less or greater than $V_{in}$. Since there are eight bistables in the shift register 20 as well as in buffer register 26, the process of quantizing the input voltage continues through eight cycles so that the final binary representation contained in buffer register is accurate to within one part in $2^8$, or one part in 256.

After the unit bit in shift register 20 has reached the last bit location, and the corresponding bistable of buffer register 26 has been set and possibly reset, buffer register 26 contains a binary-quantized representation of $V_{in}$, and the system is ready to store this binary representation in the core memory.

The memory system is of a conventional organization commonly referred to as bit-organized or coincident-current, but it is noted that a word-organized or linear select memory organization bill achieve the same results and therefore may be substituted for the bit-organized memory of the preferred embodiment. The memory system of the preferred embodiment employs coincident-current bit selection whereby a half-select current from an X-current driver and a half-select current from a Y-current driver add to produce a full read or write current in each bit of a given word location. Still referring to FIG. 1, a magnetic core memory 32 has associated Y-current drivers 34 and X-current drivers 36. A word which is read out of a memory location is amplified in sense amplifiers 38 and transferred to buffer register 26. An address register 40 feeds a decoder 42 to enable the proper X- and Y-current drivers to select the storage location that is indicated in the address register 40. The address register 40 comprises eight bistable circuits connected as a counter or scaler so that continued pulsing of the input will cycle the output voltage combinations through the same set of addresses every two hundred and fifty-six pulses. The reason for using eight bistables is that there are 256 memory locations in the core memory 32, and the counter arrangement simplifies the task of advancing the address by requiring triggering or pulsing the input.

As is conventional, a word is written into the memory 32 by coupling the word to inhibit drivers 44, and enabling the Y-current drivers 34 and the X-current drivers 36. There are eight individual circuits in each of the X-current drivers 36 and Y-current drivers 34, as well as in the inhibit drivers 44 and sense amplifiers 38. This is so that the binary words in buffer register 26 can be processed in parallel. The various drivers are simply current amplifiers matched to drive the memory planes. However, the X- and Y-current drivers send alternate positive and negative current pulses since, as explained below, during the memory read cycle, the cores must be driven to the "zero" state, and during the memory write cycle, there must be provision to drive the cores to the "one" state.

In the instant case, each memory word has 8 cores thereby enabling it to store the 8 bits of buffer register 26 in parallel. A word in a particular storage location is recovered or read out of the memory 32 by enabling the proper X-current driver 36 and the proper Y-current driver 34 for a given storage location contained in the address register 40. The half-select currents from the current drivers then switch those cores which had been in the "one" state to the "zero" state thereby transmitting a pulse to that sense amplifier 38 which is associated with the particular bit plane. If the core contained a "zero," two half-select currents will merely further drive the core into saturation and no pulse will be transferred to its associate sense amplifier 38. The sense amplifiers 38 transfer the recovered word to buffer register 26, and digital to analog converter 11 converts it back to an analog representation which is the desired voltage that had been delayed.

A word is written into the memory 32 by coupling the word from buffer register 26 to the inhibit drivers 44 so that when the current drivers are energized during the memory write cycle, the inhibit drivers 44 are also energized. Those bits of the buffer word to be written into the memory 32 which contain "zeroes" will energize its associated inhibit driver 44, thereby sending a half-select current to cancel out one of the other half-select currents from the current drivers thus preventing switching the core to its "one" state. Those bits of the buffer word which contain a "one" do not energize their associated inhibit driver 44, and the two half-select currents from the current drivers switch the associated core into the "one" state. It will be noted that in addition to this circuit function, the inhibit drivers 44 perform the important logic function of gating a word to be written into the memory 32 during the time the write circuitry is operative.

The outputs of the bistables of buffer register 26 are coupled to the input of the inhibit drivers 44 at all times since the gating function is performed at the inhibit drivers 44 themselves during the memory write cycle. After the unit pulse has been shifted out of the last bit location of shift register 20, control unit 13 transmits a pulse along line 18*b* to enable the inhibit drivers 44, the X-current drivers 36 and the Y-current drivers 34 to write the word contained in buffer register 26 into the memory 32 at the storage, or word, location indicated by address register 40. Buffer register 26 is then reset by a pulse from control unit 13 to input 18*g*.

A subsequent clock pulse from control unit 13 along line 18*d* advances the address register 40 by one, as explained above.

After the address register 40 has been advanced, a clock pulse from control unit 13 along line 18*e* enables sense amplifiers 38, X-current drivers 36, and Y-current drivers 34 to read out the word in the newly-addressed memory word location into sense amplifiers 38, which in turn transfer the recovered word directly into buffer register 26 which had been reset after the quantized representation of $V_{in}$ was written into the previously-addressed memory storage location.

A transfer gate 46 has one input (called enabling input) from the control unit 13 along line **18*f* and another input (called signal input) from the output of the digital to analog converter 11. The transfer gate 46 is not a binary gate, but may be thought of as a gated analog transfer circuit in the sense that the voltage appearing on its signal input is fed through the transfer gate 46 without modification whenever an enabling pulse appears at its enabling input, indicated at line 18*f***. This may be distinguished from a binary AND gate in which the output assumes only one of two possible states.

The word recovered from memory 32 and appearing in buffer register 26 is then converted to a representative analog signal by digital to analog converter 11 and gated through the transfer gate 46 by a pulse from control unit 13 occurring subsequent in time to the read pulse.

A low pass filter 48 is connected to the output of transfer gate 46 to smooth the output voltage, $V_{out}$, since the output of gate 46 appears as a series of pulses having various amplitudes. The output of the low pass filter 48 is then the desired delayed analog voltage which is the output of the system, $V_{out}$. The total delay time is slightly less than the time required for address register 46 to cycle through all 256 memory storage locations. It is noted that the system has no inherent attenuation of amplitude or distortion of the delayed signal.

Figure 2:
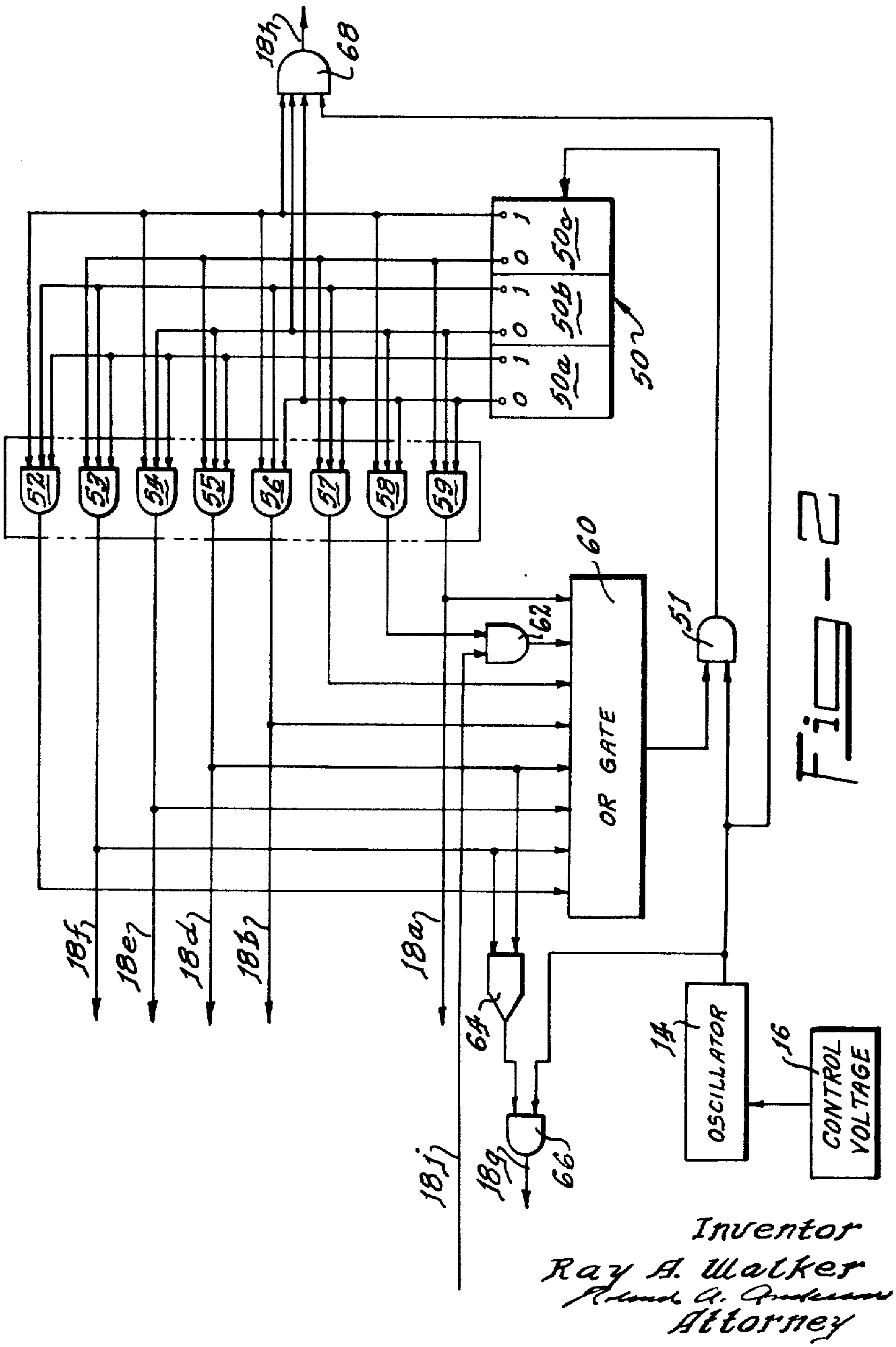
FIG. 2 is a detailed logic schematic of the Control Unit of FIG. 1.

Referring now to FIG. 2, the details of control until 13 will be set forth. A counter 50 (consisting of three bistable circuits, **50*a*, 50*b*, and 50*c*, connected to scale or count input pulses) receives clock pulses from the oscillator 14 through an AND gate 51. Every clock pulse passing through AND gate 51 increases the binary output of counter 50** by one.

A set of eight AND gates 52, 53, 54, 55, 56, 57, 58 and 59 are connected to the outputs of bistables **50*a*, 50*b* 50*c* to decode those outputs into eight separate outputs, one for each of eight possible combinations of the outputs of bistables 50*a*, 50*b* and 50*c*. Consequently, a "one" signal would appear sequentially at the outputs of each of the AND gates 59, 58, 57, 56, 55, 54, 53 and 52 in the order named if counter 50 received a series of pulses from oscillator 14. The outputs of the AND gates 52–59 control the timing of the various elements of the system in timed relation to the clock signal of oscillator 14**.

An eight-input OR gate 60 receives the outputs of AND gates 52, 53, 54, 55, 56, 57 and 59 directly. The output of AND gate 58 is directly coupled to one input of another AND gate 62. The output of AND gate 62 is coupled to an input of the OR gate 60. The other input of AND gate 62 comes from the last bistable shift register 20 (FIG. 1) to contain the unit bit. The outputs and AND gates 53 and 55 comprise inputs to an OR gate 64. The output of OR gate 64 is one input to and AND gate 66. The other input to AND gate 66 is the output of oscillator 14.

An AND gate 68 has four inputs consisting of: the output of oscillator 14; the reset output of bistable **50*a* comprising the most significant digit of counter 50; the reset output of bistable 50*b* comprising the second most significant digit of counter 50; and the set output of bistable 50*c* comprising the least signficant digit of counter 50. Therefore, when counter 50 is in the "001" state, AND gate 68 is enabled and transmits clock pulses from oscillator 14** to its output.

The operation of the control unit 13 will now be explained. Assuming that counter 50 has been reset; that is, the set outputs of the bistables **50*a*, 50*b* and 50*c* contain "zeroes," the three inputs to AND gate 59 are the complements of the set outputs and hence are "ones." Therefore, AND gate 59 has a "one" output. When the output of AND gate 59 is "one," it loads the unit bit into shift register 20 along line 18*a* (FIG. 1) and enables AND gate 51 through OR gate 60, thereby transmitting the next clock pulse from oscillator 14 through AND gate 51 to advance counter 50** by one.

At this time, three inputs to AND gate 58 are now "ones," thereby making its output a "one." The output of AND gate 58 does not directly enable AND gate 51 through OR gate 60 because AND gate 62 is blocking the signal flow. Further, AND gate 51 will not be enabled until the unit bit is shifted to the least significant digit of shift register 20 thereby enabling AND gate 62.

It can be seen that the combination of outputs of counter 50 does enable AND gate 68, and consequently the next clock pulse from oscillator 14 will be transmitted through AND gate 68 along line **18*h* through delay 22 to shift the unit bit in shift register 20 to the next bit, as explained above. Before the shifting, however, the most significant bit of the binary representation of $V_{in}$ has been encoded in buffer register 26**, as explained above.

When the unit bit has progressed to the last bit of shift register 20 and $V_{in}$ has been completely, quantized, a "one" signal appears on line **18*j* which is connected to AND gate 62 (FIG. 2) thereby enabling AND gate 51 through OR gate 60 to transmit the next clock pulse from oscillator 14 to advance counter 50 and enable AND gate 57**.

When all inputs to AND gate 57 are "ones," the AND gate 51 is again enabled to transmit the next clock pulse from oscillator 14 to advance counter 50. No other function is performed by AND gate 57. A "one" output from AND gate 56 occurs next in time, and it allows the newly-quantized word in buffer register 26 to be written into core memory 32 by enabling inhibit drivers 44, X-current drivers 36 and Y-current drivers 34 along line **18*b*. The output of AND gate 56 also allows counter 50 to be advanced by the next clock pulse from oscillator 14 and thereby enable AND gate 55**.

The output of AND gate 55 advances address register 40 to select a new memory storage location. The output of AND gate 55 is also fed through OR gate 64 to AND gate 66 to transmit the next clock pulse to reset buffer register 26 along line **18*g*. Counter 50 is also advanced and AND gate 54 enabled. The output of AND gate 54 allows the word in the newly-addressed storage location to be recovered therefrom by enabling sense amplifiers 38, X-current drivers 36 and Y-current drivers 34 along line 18*e*. The output of AND gate 54 also allows counter 50 to be advanced. At this time the word recovered from the newly-addressed storage location appears in buffer register 26**.

The output of AND gate 53 enables transfer gate 46 thereby transferring the analog representation of the word in buffer register 26 to the output terminal through low pass filter 48. Counter 50 is also advanced, and AND gate 66 is enabled through OR gate 64, thereby transmitting the next clock pulse from oscillator 14 along line **18*g* to reset buffer register 26**.

The output of AND gate 52 merely allows counter 50 to be reset on the next subsequent clock pulse from oscillator 14. The system is then ready to quantize the input voltage again.

It can be seen that the clock signal repetition rate, as mentioned above, establishes the time base for the entire system, so that by providing that the repetition rate of oscillator 14 be dependent on an input voltage level, the total time delay varies as a function of the input control voltage 16 to oscillator 14.

The specific embodiment described above is capable of modification and substitution of equivalent elements, and it is intended that the scope of the invention be determined only by the appended claims.

The embodiments of the invention in which an exclusive property or privilege is claimed are defined as follows:

1. Apparatus for delaying an input continuous electrical signal for a predetermined time before transferring it to an output terminal, comprising:

means for generating a clock signal;

control means receiving said clock signal for producing a recurring sequence of pulsed outputs including first, second, third and fourth outputs, respectively;

magnetic core memory means including selectable storage locations for storing binary words;

register means for cyclically selecting successive storage locations in said memory means in response to said first output;

said memory means further including reading means for recovering the binary word stored in a selected storage location in response to said second output;

means receiving the input signal for quantizing said signal into input binary words representative of the input signal in response to said third output;

said memory means further including writing means receiving an input binary word from said quantizing means for writing an input binary word in a selected storage location in response to said fourth output;

means connected to said memory reading means for converting the binary word recovered from said memory means to a representative analog signal;

means for transferring said analog signal to said output terminal;

whereby said input continuous signal is delayed approximately by the time required to cycle through all of said storage locations before being transferred to the output terminal.

2. The apparatus of claim 1 wherein said clock signal generating means comprises:

an oscillator having the repetition rate of oscillation functionally related to an oscillator input control voltage, whereby the total delay time of the input continuous signal is predetermined by the setting of said oscillator input control voltage; and means coupled to said oscillator for supplying an input control voltage thereto.

3. The apparatus of claim 1 wherein said quantizing means includes a buffer register receiving and storing said input binary words, said apparatus further including gating means coupling the binary word of said buffer register to the selected memory storage locations, said gating means enabling the buffer register word to be stored in the selected location of said memory in response to said fourth output.

4. The apparatus of claim 3 wherein said means for converting the binary word to a representative analog signal comprises:

read gating means responsive to said second output for gating the word recovered from said memory by said reading means into said buffer register;

a digital to analog converter coupled to the output of said buffer register for converting the binary word of said buffer register to a representative analog signal; and output gating means coupling the output signal of said digital to analog converter to said analog signal transferring means for transmitting said converter output signal in response to said second output.

5. The apparatus of claim 4 wherein said register means comprises a plurality of bistable circuits, connected as a binary counter having its input connected to said first output, the binary output of said counter being representative of the selected storage location and cyclically recirculating through a set of numbers representative of successive memory storage locations.

6. The apparatus of claim 5 wherein said quantizing means further includes:

a differential amplifier having a first input connected to the output of said digital to analog converter and a second input connected to said input continuous signal, said amplifier having a signal at its output only when the output of said digital to analog converter exceeds said input signal;

a shift register having as many bit locations as said buffer register and adapted to shift a unit bit received in its most significant digit location in the order of lesser significant digit locations in timed relation to said fourth output;

means for entering a pulse in the most significant digit location of said shift register;

setting means coupling the parallel outputs of said shift register to parallel inputs of said buffer register for setting the bit location of said buffer register corresponding to the same bit location of said shift register when said shift register bit location contains said unit bit; and means responsive to the output signal of said differential amplifier for sequentially resetting the buffer register digit locations in timed relation to said unit bit being shifted in said shift register; and gating means connecting the output signal of said differential amplifier to said resetting means only when said unit bit is in said shift register;

whereby said unit bit enters the most significant bit location of said shift register thereby setting the corresponding bit location in said buffer register, said buffer register bit location being reset only if the output of the digital to analog converter, receiving in parallel the outputs of all buffer register bit locations and converting them to a representative analog signal, is greater than the input signal, said buffer register containing a binary representation of said input signal when said unit bit has shifted through all bit locations of said shift register.

References Cited

UNITED STATES PATENTS

| | | | |
|---|---|---|---|
| 3,108,256 | 10/1963 | Buchholz et al. | 340—172.5 |
| 3,193,802 | 7/1965 | Deerfield | 340—172.5 |
| 3,197,621 | 7/1965 | Urquhart | 340—172.5 X |
| 3,222,670 | 12/1965 | Harel | 340—172.5 X |
| 3,225,333 | 12/1965 | Vinal | 340—172.5 |
| 3,273,131 | 9/1966 | Strohm et al. | 340—172.5 |
| 3,274,559 | 9/1966 | Grioux et al. | 340—172.5 |
| 3,278,907 | 10/1966 | Barry et al. | 340—172.5 |

PAUL J. HENON, *Primary Examiner.*